L. W. HORNE.
LAMP GUARD.
APPLICATION FILED AUG. 27, 1921.
1,432,026.
Patented Oct. 17, 1922.
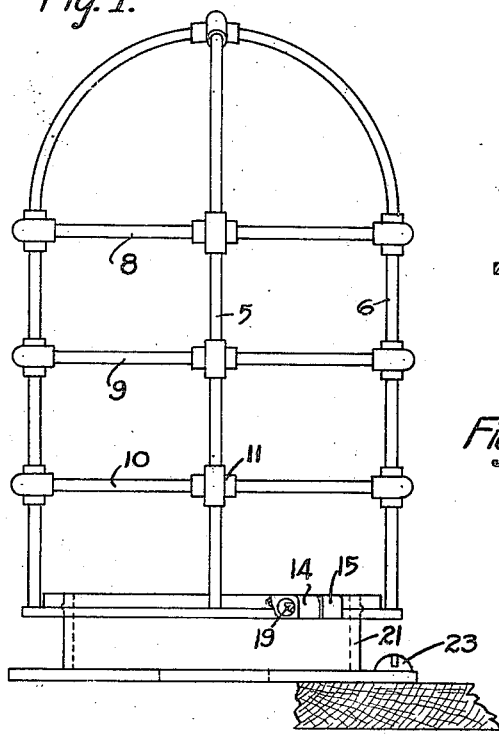
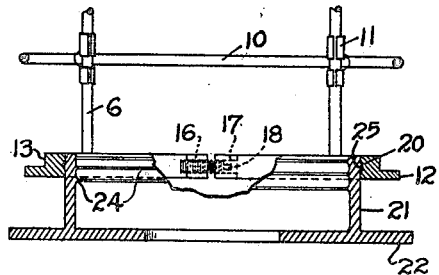
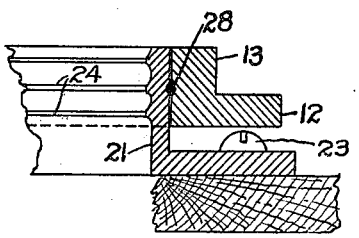
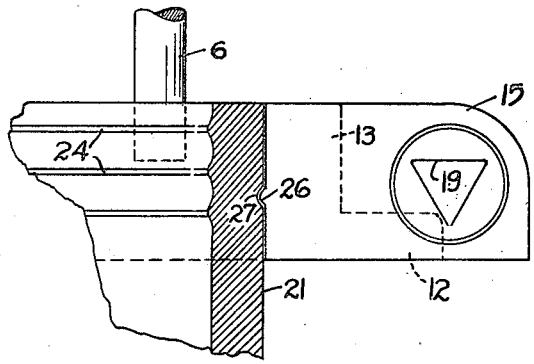
INVENTOR
L. W. Horne
BY
Arthur Phelps Marr
ATTORNEY Patented Oct. 17, 1922.

1,432,026

UNITED STATES PATENT OFFICE.

LAWRENCE WESLEY HORNE, OF JERSEY CITY, NEW JERSEY.

LAMP GUARD.

Application filed August 27, 1921. Serial No. 496,111.

*To all whom it may concern:*

Be it known that I, LAWRENCE W. HORNE, a citizen of the United States, and resident of city of Jersey City, county of Hudson, State of New Jersey, have invented certain new and useful Improvements in Lamp Guards.

The guard the subject of this invention is particularly intended for use on ship board or in shops or warehouses or other places where a guard will be submitted to extremely arduous service and for that reason the guard and associated parts are made strong and of relatively large size.

The particular object of this invention is to produce a guard that cannot be removed unauthorizedly and yet which may be readily removed when desired.

In the past these guards have usually been screw threaded to the socket or lamp base receiving member and it very often has occurred that the screw threads become oxidized to such an extent that even when the locking means is released the guard cannot be removed and must be sawed through to attempt the removal of the enclosing globe and lamp. It is to overcome this difficulty that I have invented the guard that I will now describe in detail and the following is what I consider the best means of carrying out the invention and the accompanying drawing should be referred to for a complete understanding of the specification which follows:

In the drawing:

Fig. 1 is a view in elevation of the guard in portable position.

Fig. 2 is a sectional view of a part of the guard.

Fig. 3 is a fractional and enlarged view of a part.

Fig. 4 is still further and enlarged view partly in section.

Similar reference numerals indicate like parts in all the figures where they appear:

The guard proper may be of any shape or size, but as this particular type of guard is subjected to rough usage, I prefer that it should be constructed on the general plan of more strongly made guards having looped or arched members 5 and 6 crossing each other at 7 and encirling or banding members 8, 9 and 10 exterior to the arched members 5 and 6 and these two members being formed of brass or other suitable metallic rods secured at every junction by means of clips.

The ends of the members 5 and 6 are secured in the flange 12 formed integral with the split ring 13 and adjacent of the split in the ring 13 I provide outwardly extending lugs 14 and 15, one of which is screw threaded as shown at 16 and the other of which is recessed as shown at 17 to receive the locking stud 18, the head of which is triangularly shaped as shown at 19 to receive the suitable key.

Upon the interior of the ring 13 I produce an annular groove 20 for a purpose that shall appear later.

The member 21 is provided with the flange 22 perforated to receive screws 23 by means of which the said member may be secured to the ceiling, bulkhead or other suitable support. This member 21 is provided with coarse screw threads 24 upon its interior and the annular projection 25 upon its exterior. Within the member 21 the lamp receiving socket or support is arranged and the enclosing glass globe is screw threaded into the screw threads 24. The projection 25 is received into the annular groove 20 in the ring 13 and when so received the locking screw or stud 16 presses together the lugs 14 and 15 securing the ring 13 and guard support thereby upon the member 21.

The projecting portion of the member 21 may be shortened as shown in Fig. 3 so that the flange 12 will approximately meet the securing screw 23, this will prevent the recess 20 over-riding the projection 25.

It is obvious that a projection 26 may be made on the ring 13 and a relative recess 27 produced in the member 21 or both the ring 13 and the member 21 may be provided with grooves as shown in Fig. 3 and the wire member 28 placed so that it will engage in both grooves, that parts may be used without the whole and that other modifications may be made within the scope of the appended claims without departing from the subject of this invention.

What I claim and desire to obtain by Letters Patent is as follows:

1. A lamp guard and means for supporting it, comprising a ring and a flanged member, one of which is provided with a recess and the other having a projection adapted to be received in said recess.

2. A lamp guard and means for supporting it, comprising a flanged ring secured to said guard and a supporting member, said ring being provided with an annular recess and a projection formed upon said supporting member and adapted to engage in said recess and means for locking said ring upon said supporting member.

3. A lamp guard comprising a ring and a supporting member and a projection and relative recess between said ring and said supporting member to secure them in operative relation.

Signed at the city of Jersey City, State of New Jersey, this 24th day of August, 1921.

LAWRENCE WESLEY HORNE.